United States Patent
Tabata et al.

(10) Patent No.: US 7,878,546 B2
(45) Date of Patent: Feb. 1, 2011

(54) BELT GUIDE ANCHOR AND SEAT BELT UNIT INCLUDING THE SAME

(75) Inventors: Yuki Tabata, Tokyo (JP); Tadashi Sugiyama, Tokyo (JP)

(73) Assignee: Takata Corporation, Tokyo (JP)

( * ) Notice: Subject to any disclaimer, the term of this patent is extended or adjusted under 35 U.S.C. 154(b) by 369 days.

(21) Appl. No.: 12/098,177

(22) Filed: Apr. 4, 2008

(65) Prior Publication Data

US 2008/0252059 A1 Oct. 16, 2008

(30) Foreign Application Priority Data

Apr. 13, 2007 (JP) .............................. 2007-105860

(51) Int. Cl.
*B60R 22/00* (2006.01)
(52) U.S. Cl. .................... 280/801.1; 280/804; 280/808; 297/482; 297/483; 297/486
(58) Field of Classification Search .............. 280/801.1, 280/804, 808; 297/482, 483, 468
See application file for complete search history.

(56) References Cited

U.S. PATENT DOCUMENTS

| | | | | |
|---|---|---|---|---|
| 5,037,135 | A * | 8/1991 | Kotikovsky et al. | 280/808 |
| 5,257,820 | A | 11/1993 | Kosugi | |
| 5,513,880 | A | 5/1996 | Ohira et al. | |
| 6,290,259 | B1 * | 9/2001 | Drobot et al. | 280/808 |
| 6,439,609 | B1 * | 8/2002 | Smithson | 280/801.1 |
| 6,702,327 | B2 * | 3/2004 | Janz | 280/808 |
| 7,201,400 | B2 | 4/2007 | Hattori | |
| 7,581,758 | B2 * | 9/2009 | Durrer et al. | 280/808 |
| 2003/0020271 | A1 * | 1/2003 | Okubo | 280/808 |

| | | | |
|---|---|---|---|
| 2005/0236828 | A1 * | 10/2005 | Noda et al. ................. 280/808 |

FOREIGN PATENT DOCUMENTS

| | | |
|---|---|---|
| JP | 7-329710 | 12/1995 |
| JP | 2000-142317 | 5/2000 |
| JP | 2001-18745 | 1/2001 |
| JP | 2001-80460 | 3/2001 |

(Continued)

*Primary Examiner*—Toan C To
(74) *Attorney, Agent, or Firm*—Fitch, Even, Tabin & Flannery

(57) ABSTRACT

A belt guide anchor is provided to improve handling operability of a seat belt even when a belt opening angle between a portion of the seat belt adjacent to a retractor and that adjacent to an occupant is increased. A belt guide anchor has a belt insertion hole into which a seat belt is fitted so as to be slidable and expanded portions formed on surfaces of the belt guide anchor facing the interior and exterior, respectively, of the vehicle adjacent to the belt insertion hole. In one form, a thin portion is formed in the expanded portion on the surface facing the interior of the vehicle at a position adjoining a part of the belt insertion hole facing the front side of the vehicle, and a thin part is formed in the expanded portion on the surface facing the exterior of the vehicle at a position adjoining a part of the belt insertion hole facing the rear side of the vehicle. With this, even when a belt opening angle θ is large, the seat belt comes into light contact with the thin portions in the expanded portions. Thus, the friction during drawing of the seat belt is small, and the seat belt can be smoothly drawn out.

10 Claims, 4 Drawing Sheets

FOREIGN PATENT DOCUMENTS

| | | |
|---|---|---|
| JP | 2002-200964 | 7/2002 |
| JP | 2002-220026 | 8/2002 |
| JP | 2002-331910 | 11/2002 |
| JP | 2003-19944 | 1/2003 |
| JP | 2004-338477 | 12/2004 |

* cited by examiner (a)

(b)

BELT GUIDE ANCHOR AND SEAT BELT UNIT INCLUDING THE SAME

FIELD OF THE INVENTION

The present invention relates to belt guide anchors that are supported by vehicle bodies such as pillars and guide seat belts in seat belt units to shoulders of occupants, and relates to seat belt units including the belt guide anchors.

BACKGROUND OF THE INVENTION

Seat belt units installed in vehicle seats in automobiles and the like have been used for restraining occupants with seat belts in the units in emergency situations such as collisions in which a large deceleration acts on the vehicles. Among such seat belt units, those supported by pillars of vehicle bodies and including belt guide anchors that guide seat belts such that the seat belts are slidable, for example, have been discussed in, for example, Japanese Unexamined Patent Application Publication No. 2002-200964.

According to a belt guide anchor described in Japanese Unexamined Patent Application Publication No. 2002-200964, a seat belt drawn from a seat belt retractor is folded back at the belt guide anchor and guided to a shoulder of an occupant so as to be fitted to the occupant. With this, the seat belt can restrain the occupant at a correct position.

In some cases, seat belt retractors in seat belt units need to be disposed far rearward of occupants depending on layouts of vehicles. When the seat belt retractors are disposed at rear positions in this manner, belt opening angles between portions of seat belts before being folded at belt guide anchors (i.e., portions adjacent to the seat belt retractors) and portions of the seat belts after being folded at the belt guide anchors (i.e., portions adjacent to the occupants) become large.

However, in the belt guide anchor described in Japanese Unexamined Patent Application Publication No. 2002-200964, molded resin portions adjoining a belt insertion hole are made thick, and project in the thickness direction of the belt guide anchor (inward and outward directions at a side of a vehicle) by a large amount. These expanded portions can increase the radii of curvature of the molded resin portions adjoining the belt insertion hole such that a seat belt can be smoothly slid at these portions.

When the expanded portions are formed in the vicinity of the belt insertion hole in this manner and the belt opening angle between the portion of the seat belt adjacent to the seat belt retractor and that adjacent to an occupant is increased as described above, the seat belt is pressed into contact with these expanded portions. Therefore, friction between the seat belt and the expanded portions of the belt guide anchor when the seat belt is drawn out is increased, and the seat belt cannot be smoothly drawn out. Furthermore, the belt guide anchor can be rotated by the frictional force, and an offset (jamming) of the seat belt can occur more easily. Accordingly, when the seat belt retractor is disposed in a vehicle in the above-described layout, the handling operability of the seat belt can be impaired.

Degradation of the operability of the seat belt can be prevented by increasing the width of the belt insertion hole of the belt guide anchor. However, when the width of the belt insertion hole is increased, the movement of the seat belt cannot be regulated in the width direction. Thus, the offset can easily occur in a similar manner.

SUMMARY OF THE INVENTION

Accordingly, an object of the present invention is to provide a belt guide anchor capable of improving handling operability of a seat belt even when a belt opening angle between a portion of the seat belt adjacent to a retractor and that adjacent to an occupant is increased, and to provide a seat belt unit including the belt guide anchor.

To solve the above-described problems, a belt guide anchor according to a first invention of the present invention, having a belt insertion hole into which a seat belt drawn from a seat belt retractor is fitted so as to be slidable and expanded portions disposed on both surfaces of the belt guide anchor facing the interior and exterior of a vehicle adjacent to the belt insertion hole, and guiding the seat belt to an occupant via the belt insertion hole, includes a first thin part disposed in the expanded portion on the surface of the belt guide anchor facing the interior of the vehicle at a lower position of a part of the belt insertion hole facing the front side of the vehicle when the belt guide anchor is attached to the vehicle body, the thickness of the first thin part being smaller than that of the expanded portion located at a lower position of a part of the belt insertion hole facing the rear side of the vehicle when the belt guide anchor is attached to the vehicle body; and a second thin part disposed in the expanded portion on the surface of the belt guide anchor facing the exterior of the vehicle at a lower position of the part of the belt insertion hole facing the rear side of the vehicle when the belt guide anchor is attached to the vehicle body, the thickness of the second thin part being smaller than that of the expanded portion located at a lower position of the part of the belt insertion hole facing the front side of the vehicle when the belt guide anchor is attached to the vehicle body.

Moreover, according to a second form of the present invention, the first thin part disposed on the surface of the belt guide anchor facing the interior of the vehicle is thinner than a part of the expanded portion facing the rear side of the vehicle at a position symmetrical to the first thin part disposed in the expanded portion facing the front side of the vehicle with respect to a vertical center line when the belt guide anchor is attached to the vehicle body, and the second thin part disposed on the surface of the belt guide anchor facing the exterior of the vehicle is thinner than a part of the expanded portion facing the front side of the vehicle at a position symmetrical to the second thin part disposed in the expanded portion facing the rear side of the vehicle with respect to the vertical center line when the belt guide anchor is attached to the vehicle body.

Furthermore, according to a third form of the present invention, the thin parts disposed on the surfaces of the belt guide anchor facing the interior and exterior of the vehicle are both recessed portions.

On the other hand, a seat belt unit according to a fourth form of the present invention includes a seat belt to be worn by an occupant; a seat belt retractor that retracts the seat belt such that the seat belt can be drawn out and prevents the seat belt from being drawn out in an emergency situation; a belt guide anchor that guides the seat belt drawn from the seat belt retractor to the occupant; a tongue supported by the seat belt passing through the belt guide anchor so as to be slidable; and a buckle attached to a vehicle body or a vehicle seat, the tongue being engaged with the buckle so as to be detachable.

The belt guide anchor is the belt guide anchor according to any one of the first to third forms of the present invention.

In accordance with the belt guide anchor having the above-described structure according to the present invention, the first thin part is formed in the expanded portion facing the front side of the vehicle on the surface of the belt guide anchor facing the interior of the vehicle at the position adjoining the part of the belt insertion hole facing the front side of the vehicle, and the second thin part is formed in the expanded portion facing the rear side of the vehicle on the surface of the belt guide anchor facing the exterior of the vehicle at the position adjoining the part of the belt insertion hole facing the rear side of the vehicle. Thus, when a portion of the seat belt adjacent to the occupant passing through the belt insertion hole is inclined at a maximum angle and extends downward and forward of the vehicle, a side end of the portion of the seat belt adjacent to the occupant facing the front side of the vehicle comes into light contact with the first thin part in the belt guide anchor. In addition, when a portion of the seat belt adjacent to the retractor to be passing through the belt insertion hole is inclined at a maximum angle and extends upward and forward of the vehicle, a side end of the portion of the seat belt facing the rear side of the vehicle comes into light contact with the second thin part in the belt guide anchor and the peripheral portions thereof.

With this structure, the friction between the seat belt and the thin parts in the expanded portions can be reduced, and the occupant can smoothly draw the seat belt out when he/she wears the seat belt. In this case, even when the seat belt is drawn from a rear position of the vehicle significantly away from the occupant and a belt opening angle between the portion of the seat belt adjacent to the retractor and the portion of the seat belt adjacent to the occupant is large, the friction between the seat belt and either of the thin parts can be reduced, and the seat belt can be smoothly drawn out. Thus, the handling operability of the seat belt can be improved. Moreover, in some cases, the seat belt barely comes into contact with either of the thin parts of the expanded portions and the peripheral portions thereof. In this case, the friction between the seat belt and either of the thin parts and that between the seat belt and the peripheral portions of the thin parts can be further reduced.

Moreover, a part of the belt guide anchor on the surface facing the exterior of the vehicle located on the back of the first thin part on the surface facing the interior of the vehicle is not made thin, and a part of the belt guide anchor on the surface facing the interior of the vehicle located on the back of the second thin part on the surface facing the exterior of the vehicle is not made thin. Thus, the strength of the belt guide anchor can be reliably maintained even when the thin parts are formed in the belt guide anchor.

Furthermore, since the width of a central guide opening of the belt insertion hole does not need to be increased, a warp or an offset (jamming) of the seat belt, which can be caused by an increase in the width of the central guide opening, can be avoided.

Furthermore, in the case where the thin parts are recessed portions, the thin parts can be simply formed by partially recessing the expanded portions. Thus, known belt guide anchors can be utilized, and an increase in cost can be regulated.

BRIEF DESCRIPTION OF THE DRAWINGS

FIG. 2(a) is a front view of a surface of the belt guide anchor facing the interior of a vehicle, and FIG. 2(b) is a rear view of a surface of the belt guide anchor facing the exterior of the vehicle.

DETAILED DESCRIPTION OF THE PREFERRED EMBODIMENTS

An embodiment of the present invention will now be described with reference to the drawings.

Figure 1:
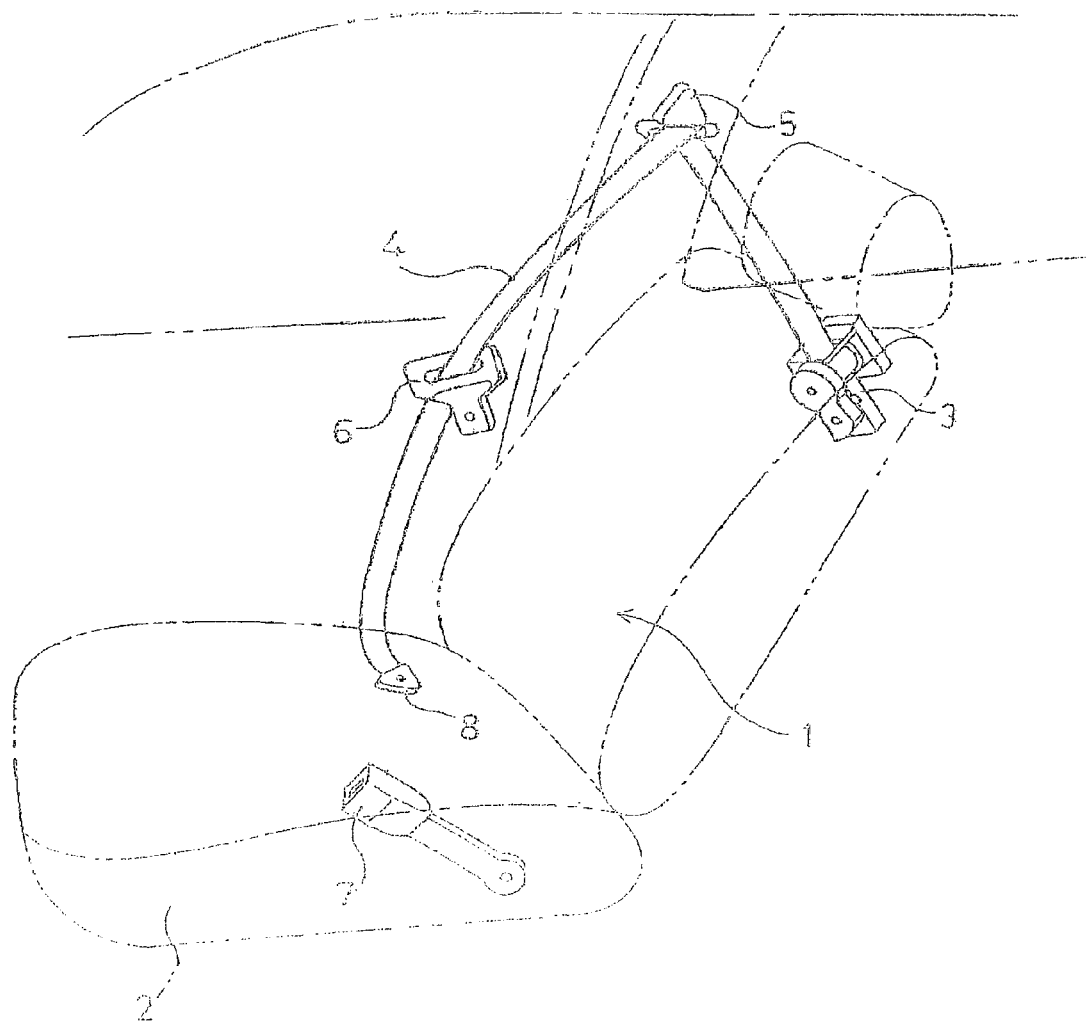
FIG. 1 is a schematic view of a seat belt unit including a belt guide anchor according to an embodiment of the present invention.

FIG. 1 is a schematic view of a seat belt unit including a belt guide anchor according to an embodiment of the present invention.

As shown in FIG. 1, a seat belt unit 1 in this embodiment includes a seat belt retractor 3 fixed to a vehicle body in the vicinity of a vehicle seat 2, a seat belt 4 drawn from the seat belt retractor 3 and having a belt anchor 8 disposed at an end thereof, the belt anchor 8 being fixed to the floor of the vehicle body or the vehicle seat 2, a belt guide anchor 5 guiding the seat belt 4 drawn from the seat belt retractor 3 to a shoulder of an occupant, a tongue 6 supported by the seat belt 4 guided by the belt guide anchor 5 so as to be slidable, and a buckle 7 fixed to the floor of the vehicle body or the vehicle seat 2, the tongue 6 to be fitted into and engaged with the buckle 7 so as to be detachable, as in known three-point seat belt units including seat belt retractors.

Figure 2:
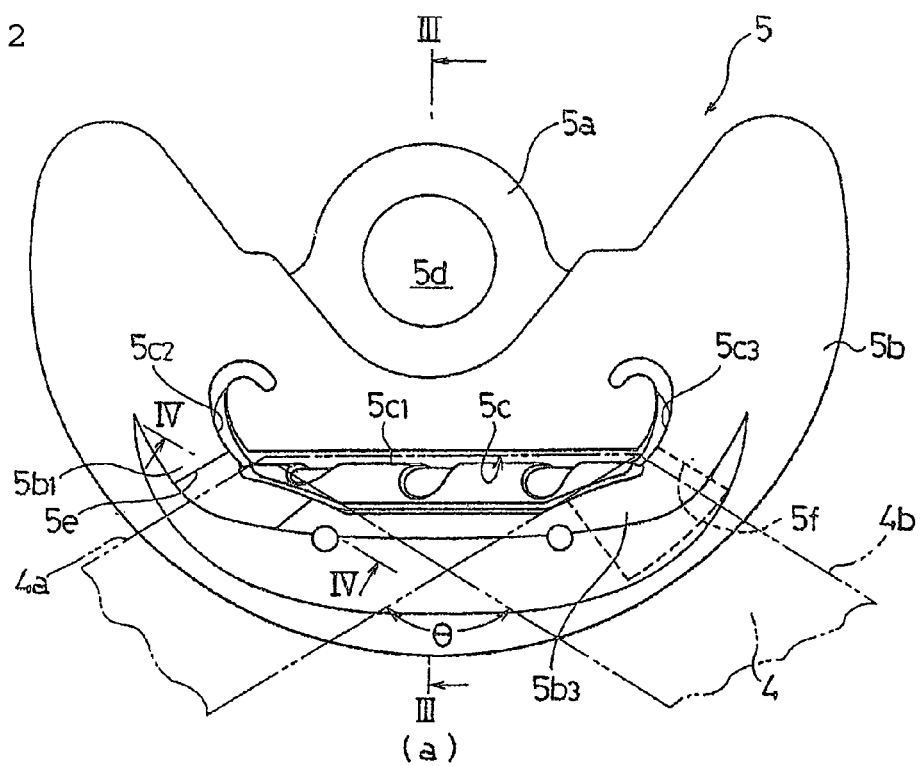
FIGS. 2(a) and 2(b) illustrate the belt guide anchor shown in FIG. 1.
Figure 2:
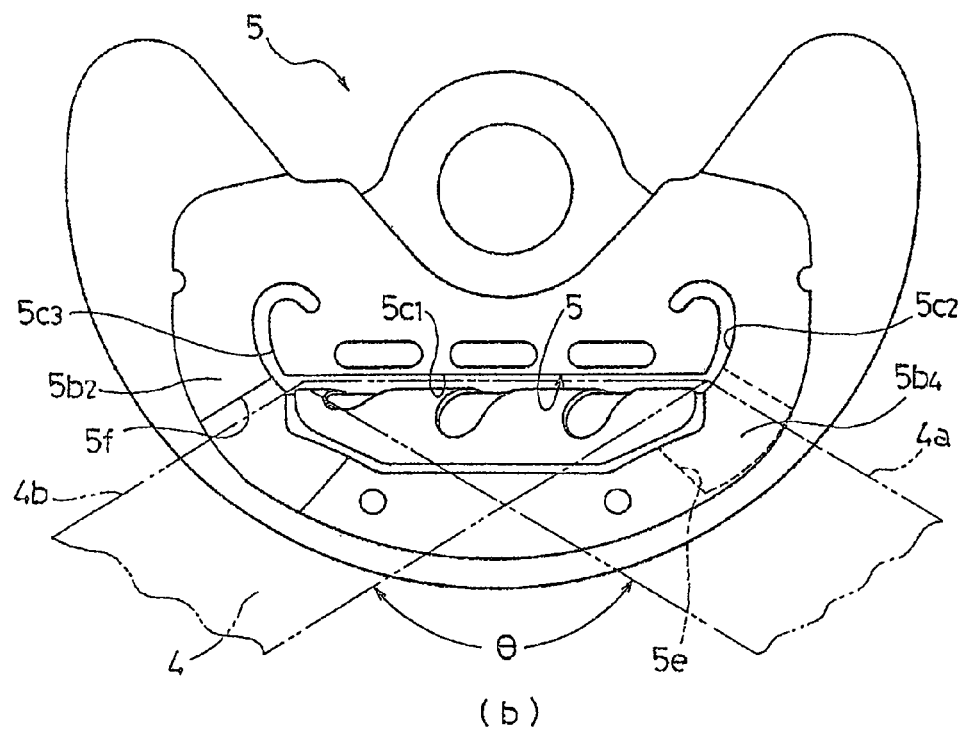
Figure 3:
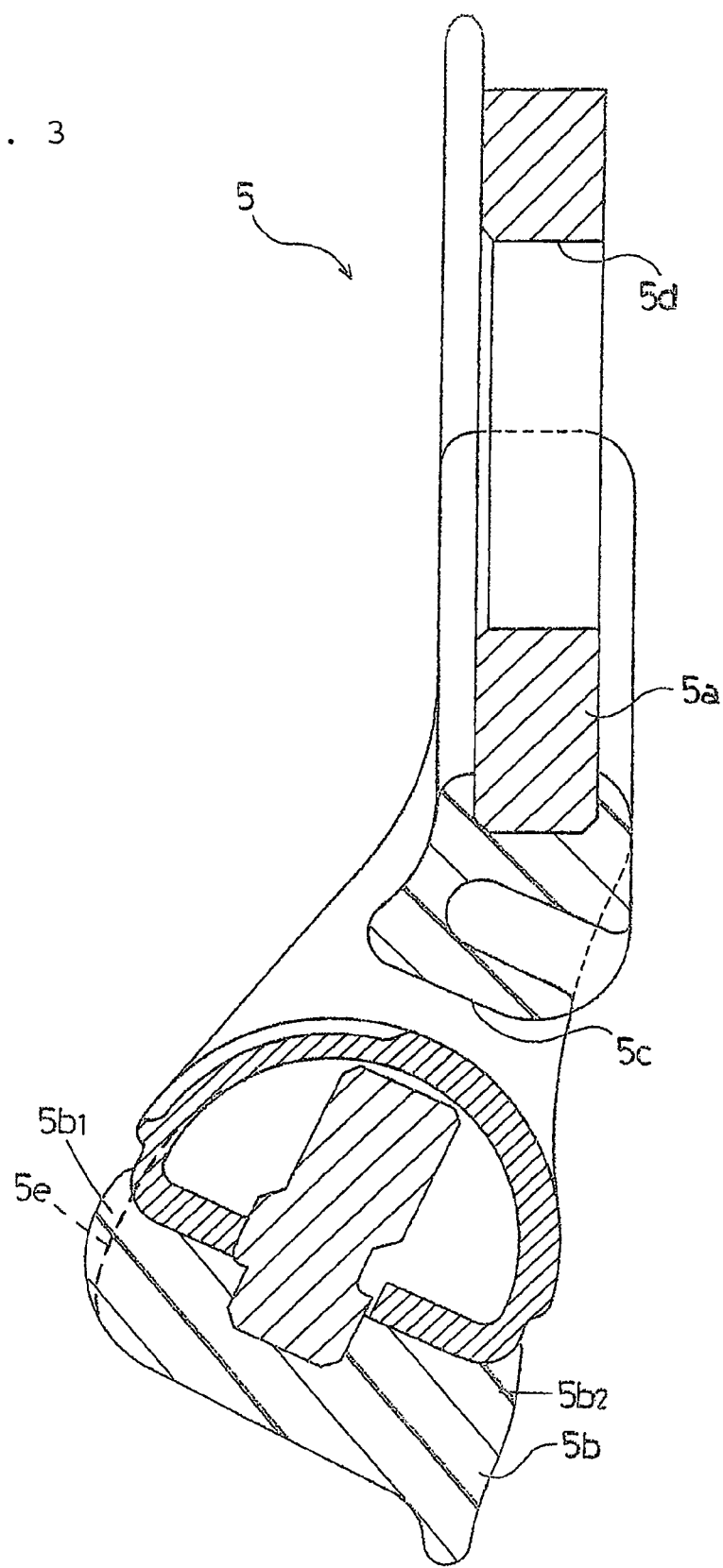
FIG. 3 is a cross-sectional view taken along line III-III in FIG. 2(a).

FIGS. 2(a) and 2(b) illustrate the belt guide anchor in this embodiment. FIG. 2(a) is a front view of a surface of the belt guide anchor facing the interior of the vehicle, and FIG. 2(b) is a rear view of a surface of the belt guide anchor facing the exterior of the vehicle. FIG. 3 is a cross-sectional view taken along line III-III in FIG. 2(a).

As shown in FIGS. 2(a) and 2(b), the belt guide anchor 5 in this embodiment basically has the same structure as those in typical known technologies. That is, as shown in FIG. 3, the belt guide anchor 5 includes a metallic plate 5a serving as a core and a resin portion 5b molded at a predetermined position of the metallic plate 5a. Furthermore, a slender belt insertion hole 5c is formed in the resin portion 5b at a predetermined position so as to extend in a front-back direction of the vehicle (left-right direction in FIG. 2(a)).

The belt insertion hole 5c is constituted by a linear central guide opening $5c_1$ guiding the seat belt 4 such that the seat belt 4 is slidable and curved relief openings $5c_2$ and $5c_3$ disposed at both ends of the central guide opening $5c_1$ so as to prevent the seat belt 4 from being twisted. The seat belt 4 drawn from the seat belt retractor 3 is fitted into the belt insertion hole 5c upward and forward of the vehicle, and folded at the belt insertion hole 5c downward and forward of the vehicle. The width of the central guide opening $5c_1$ is set to a value slightly larger than the maximum width set with consideration of the length required for folding the seat belt 4 at the belt insertion hole 5c (length between both side ends of the seat belt 4).

Moreover, the metallic plate 5a has an attachment hole 5d used for attaching the belt guide anchor 5 to the vehicle body. Furthermore, the resin portion 5b molded on the metallic plate 5a is constituted by expanded portions $5b_1$ and $5b_2$ projecting from the corresponding surfaces of the metallic plate 5a toward the interior and exterior, respectively, of the vehicle. Most parts of the belt guide anchor 5 in this embodiment including the belt insertion hole 5c and the attachment hole 5d are symmetrical or substantially symmetrical with respect to a vertical line passing through the center of the attachment hole $5d$ shown in FIGS. 2($a$) and 2($b$) as are those according to the typical known belt guide anchors.

The structure of the belt guide anchor 5 in this embodiment differs from the basic structures of the typical known belt guide anchors in the following points. That is, as shown in FIGS. 2($a$) and 3, a thin part $5e$ is formed in the expanded portion $5b_1$ of the resin portion $5b$ on a surface of the belt guide anchor 5 facing the interior of the vehicle at a lower position of a part of the central guide opening $5c_1$ facing the front side of the vehicle (left side in FIG. 2($a$)) and a part of the relief opening $5c_2$ disposed in series with the part of the central guide opening $5c_1$ facing the front side of the vehicle when the belt guide anchor 5 is attached to the vehicle body. The thin part $5e$ of the resin portion $5b$ projects from the surface of the metallic plate $5a$ by a small amount. The shape of the expanded portion $5b_1$ smoothly changes from the thin part $5e$ to peripheral portions of the thin part $5e$.

Figure 4:
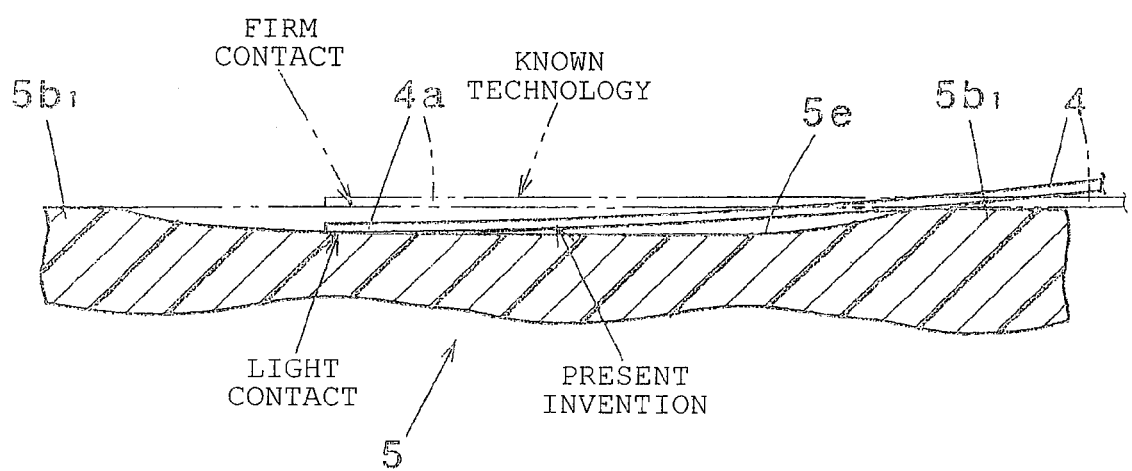
FIG. 4 is a cross-sectional view taken along line IV-IV in FIG. 2(a).

As shown in FIG. 4, when a portion of the seat belt 4 adjacent to the occupant passing through the belt insertion hole $5c$, illustrated with a solid line, is inclined at a maximum angle determined on the basis of the layout of the vehicle in which the seat belt unit 1 is installed and extends downward and forward of the vehicle, a side end $4a$ of the portion of the seat belt 4 adjacent to the occupant facing the front side of the vehicle passes over the thin part $5e$. Due to the reduced thickness of the thin part $5e$, the side end $4a$ of the portion of the seat belt 4 adjacent to the occupant comes into light contact with the thin part $5e$ in the expanded portion $5b_1$ of the resin portion $5b$ and the peripheral portion of the thin part $5e$.

The thin part $5e$ is not formed in a part $5b_3$ in the expanded portion $5b_1$ of the resin portion $5b$ on the surface of the belt guide anchor 5 facing the interior of the vehicle at a position adjoining a part of the central guide opening $5c_1$ facing the rear side of the vehicle (right side in FIG. 2($a$)) and a part of the relief opening $5c_3$ disposed in series with the part of the central guide opening $5c_1$ facing the rear side of the vehicle. Therefore, the belt guide anchor 5 in this embodiment is asymmetrical with respect to the vertical line passing through the center of the attachment hole $5d$ shown in FIG. 2($a$) at the side of the belt guide anchor 5 facing the interior of the vehicle. In other words, the thin part $5e$ in the expanded portion $5b_1$ of the resin portion $5b$ is thinner than an expanded portion of a known belt guide anchor 5 at the same position illustrated with a two-dot chain line in FIG. 4, that is, the thickness of the thin part $5e$ is smaller than that of a part of the resin portion $5b$ facing the rear side of the vehicle at a position symmetrical to the thin part $5e$ (symmetrical with respect to the vertical line passing through the center of the attachment hole $5d$ shown in FIG. 2($a$)). The thin part $5e$ can be a stepped recess.

On the other hand, as shown in FIG. 2($b$), a thin part $5f$ is formed in the expanded portion $5b_2$ of the resin portion $5b$ on a surface of the belt guide anchor 5 facing the exterior of the vehicle at a lower position of a part of the central guide opening $5c_1$ facing the rear side of the vehicle (left side in FIG. 2($b$)) and a part of the relief opening $5c_3$ disposed in series with the part of the central guide opening $5c_1$ facing the rear side of the vehicle when the belt guide anchor 5 is attached to the vehicle body. The thin part $5f$ of the resin portion $5b$ projects from the surface of the metallic plate $5a$ by a small amount. As in the case of the thin part $5e$ formed on the surface of the belt guide anchor 5 facing the interior of the vehicle, when a portion of the seat belt 4 adjacent to the retractor drawn from the seat belt retractor 3 and to be passing through the belt insertion hole $5c$ is inclined at a maximum possible angle and extends upward and forward of the vehicle, a side end $4b$ of the portion of the seat belt 4 adjacent to the retractor facing the rear side of the vehicle comes into light contact with the thin part $5f$ in the expanded portion $5b_2$ of the resin portion $5b$ and the peripheral portions of the thin part $5f$ due to the reduced thickness of the thin part $5f$. As is the thin part $5e$, the thin part $5f$ in the expanded portion $5b_2$ of the resin portion $5b$ is thinner than a part of the resin portion $5b$ facing the front side of the vehicle at a position symmetrical to the thin part $5f$ (symmetrical with respect to the vertical line passing through the center of the attachment hole $5d$ shown in FIG. 2($b$)). The thin part $5f$ can also be a stepped recess as is the thin part $5e$.

The thin part $5f$ is not formed in a part $5b_4$ in the expanded portion $5b_2$ of the resin portion $5b$ on the surface of the belt guide anchor 5 facing the exterior of the vehicle at a lower position of a part of the central guide opening $5c_1$ facing the front side of the vehicle (right side in FIG. 2($b$)) and a part of the relief opening $5c_2$ disposed in series with the part of the central guide opening $5c_1$ facing the front side of the vehicle when the belt guide anchor 5 is attached to the vehicle body. Therefore, the belt guide anchor 5 in this embodiment is asymmetrical at the side of the belt guide anchor 5 facing the exterior of the vehicle shown in FIG. 2($b$). The thin part $5f$ can also be formed in the expanded portion $5b_2$ of the resin portion $5b$ adjoining the part of the central guide opening $5c_1$ facing the front side of the vehicle and the part of the relief opening $5c_2$ disposed in series with the part of the central guide opening $5c_1$ facing the front side of the vehicle. In this case, the belt guide anchor 5 can be symmetrical at the side facing the exterior of the vehicle shown in FIG. 2($b$).

According to the belt guide anchor 5 in this embodiment, the thin part $5e$ is formed in the expanded portion $5b_1$ of the resin portion $5b$ on the surface of the belt guide anchor 5 facing the interior of the vehicle at the lower position of the part of the central guide opening $5c_1$ facing the front side of the vehicle and the part of the relief opening $5c_2$ disposed in series with the part of the central guide opening $5c_1$ facing the front side of the vehicle when the belt guide anchor 5 is attached to the vehicle body. Thus, as shown in FIG. 4, even when the portion of the seat belt 4 adjacent to the occupant passing through the belt insertion hole $5c$, illustrated with the solid line, is inclined at the maximum angle and extends downward and forward of the vehicle, the side end $4a$ of the portion of the seat belt 4 adjacent to the occupant facing the front side of the vehicle comes into light contact with the thin part $5e$ in the expanded portion $5b_1$ and the peripheral portion of the thin part $5e$.

Moreover, the thin part $5f$ is formed in the expanded portion $5b_2$ of the resin portion $5b$ on the surface of the belt guide anchor 5 facing the exterior of the vehicle at the lower position of the part of the central guide opening $5c_1$ facing the rear side of the vehicle and the part of the relief opening $5c_3$ disposed in series with the part of the central guide opening $5c_1$ facing the rear side of the vehicle when the belt guide anchor 5 is attached to the vehicle body. Thus, even when the portion of the seat belt 4 adjacent to the retractor to be passing through the belt insertion hole $5c$ is inclined at the maximum angle and extends upward and forward of the vehicle, the side end $4b$ of the portion of the seat belt 4 facing the rear side of the vehicle comes into light contact with the thin part $5f$ in the expanded portion $5b_2$ of the resin portion $5b$ and the peripheral portions of the thin part $5f$.

With this structure, the friction between the seat belt 4 and the expanded portions $5b_1$ and $5b_2$ of the resin portion $5b$ can be reduced, and the occupant can smoothly draw the seat belt 4 out when he/she wears the seat belt. In this case, even when the seat belt 4 is drawn from a rear position of the vehicle significantly away from the occupant and a belt opening angle θ (shown in FIGS. 2(a) and 2(b)) between the portion of the seat belt 4 adjacent to the retractor before being folded at the central guide opening $5c_1$ and the portion of the seat belt 4 adjacent to the occupant after being folded is large, the seat belt 4 comes into light contact with the thin parts 5e and 5f of the expanded portions $5b_1$ and $5b_2$, respectively, of the resin portion 5b and the peripheral portions thereof due to the reduced thicknesses of the thin parts 5e and 5f, and the seat belt 4 can be smoothly drawn out. Thus, the handling operability of the seat belt 4 can be improved.

In some cases, the seat belt 4 barely comes into contact with either of the thin parts 5e and 5f of the expanded portions $5b_1$ and $5b_2$, respectively, and the peripheral portions thereof In this case, the friction between the seat belt 4 and either of the thin parts and that between the seat belt 4 and the peripheral portions of the thin parts can be further reduced. Accordingly, the seat belt 4 can be drawn out more smoothly.

In contrast, the known belt guide anchor illustrated with the two-dot chain line shown in FIG. 4 does not have the thin part 5e on, for example, the surface facing the interior of the vehicle. Thus, the seat belt 4 comes into firm contact with the expanded portion $5b_1$ and the friction between the seat belt 4 and the expanded portion $5b_1$ is increased. Accordingly, the seat belt 4 cannot be smoothly drawn out using the known belt guide anchor.

Furthermore, the thin parts 5e and 5f can be simply formed by partially recessing the expanded portions $5b_1$ and $5b_2$, respectively, of the resin portion 5b. Thus, the known belt guide anchor 5 can be utilized, and an increase in cost can be regulated. In addition, since the width of the central guide opening $5c_1$ does not need to be increased, a warp or an offset (jamming) of the seat belt 4, which can be caused by an increase in the width of the central guide opening $5c_1$, can be avoided.

A belt guide anchor and a seat belt unit according to the present invention can be applied to seat belt units including belt guides that guide seat belts drawn from seat belt retractors to shoulders of occupants and fit the seat belts to the occupants so as to restrain the occupants using the seat belts guided by the belt guides.

The invention claimed is:

1. A belt guide anchor comprising:
 a body having main surfaces and opposite sides thereof;
 a guide opening of the body extending through the main surfaces for guiding a seat belt therethrough;
 an enlarged portion of the body below the guide opening;
 a first thin portion of the body enlarged portion along one of the main surfaces and adjacent one of the opposite sides of the body; and
 a second thin portion of the body enlarged portion along the other main surface and adjacent the other side of the body, wherein the body has a centerline intermediate the opposite sides, and the body enlarged portion includes thick portions on either side of the first thin portion between the first thin portion and the one side of the body, and between the first thin portion and the centerline, and thick portions on either side of the second thin portion between the second thin portion and the other side of the body, and between the second thin portion and the centerline.

2. The belt guide anchor of claim 1, wherein the first and second thin portions of the body enlarged portion are first and second recessed portions, respectively, of the body enlarged portion.

3. The belt guide anchor of claim 1 in combination with a vehicle having an interior passenger compartment in which the belt guide anchor is mounted so that the one main surface of the body faces the interior and the other main surface of the body faces exteriorly of the vehicle, and the one side of the body faces forwardly and the other side of the body faces rearwardly in the passenger compartment.

4. A belt guide anchor comprising:
 a body having main surfaces and opposite sides thereof;
 a guide opening of the body extending through the main surfaces for guiding a seat belt therethrough;
 an enlarged portion of the body below the guide opening;
 a first thin portion of the body enlarged portion along one of the main surfaces and adjacent one of the opposite sides of the body; and
 a second thin portion of the body enlarged portion along the other main surface and adjacent the other side of the body, wherein the guide opening includes a central straight portion and opposite, upwardly curved, relief portions at either side thereof, the first thin portion is below the central straight portion and one of the opposite, upwardly curved, relief portions, and the second thin portion is below the central straight portion and the other opposite, upwardly curved relief portion.

5. A belt guide anchor comprising:
 a body having main surfaces and opposite sides thereof;
 a guide opening of the body extending through the main surfaces for guiding a seat belt therethrough;
 an enlarged portion of the body below the guide opening;
 a first thin portion of the body enlarged portion along one of the main surfaces and adjacent one of the opposite sides of the body; and
 a second thin portion of the body enlarged portion along the other main surface and adjacent the other side of the body, wherein the guide opening includes a central portion that extends straight across the body between the opposite sides thereof, and the first and second thin portions form respective first and second recessed channels in the body enlarged portion with the first recessed channel generally extending at an oblique angle to the straight central portion of the guide opening and the second recessed channel generally extending at an oblique angle to the straight central portion of the guide opening.

6. The belt guide anchor of claim 5, wherein the oblique angles for the first recessed channel in the one main surface and the second recessed channel in the other main surface are substantially the same.

7. An automobile having a passenger compartment, the automobile comprising:
 a vehicle body;
 a seat for an occupant in the passenger compartment;
 a retractor mounted to the vehicle body rearwardly of the seat;
 a belt guide anchor mounted to the vehicle body adjacent the seat at an elevated position relative to the retractor;
 a body of the belt guide anchor having an interior facing surface facing in toward the passenger compartment and an exterior facing surface facing out toward the vehicle body, and opposite forward and rearward sides;
 a guide opening having a central portion extending generally straight between the body forward and rearward sides for receiving a seat belt extending therethrough;
 an enlarged portion of the body below the guide opening; and
 an interior recessed channel in the body enlarged portion extending obliquely, down and forwardly from the guide opening central portion along the interior facing surface, and an exterior recessed channel in the body enlarged portion extending obliquely, down and rearwardly from the guide opening central portion along the exterior facing surface to reduce friction between the seat belt and the enlarged portion of the belt guide anchor body with the seat belt extending forwardly and rearwardly at an incline from the guide opening.

8. The automobile of claim 7, wherein the guide opening has opposite, forward and rearward, upwardly curved, relief portions at either side of the central portion thereof, the interior recessed channel extends below the guide opening central portion and the forward, upwardly curved, relief portion and the exterior recessed channel extends below the guide opening central portion and the rearward, upwardly curved, relief portion.

9. The automobile of claim 7, wherein the belt anchor body has a centerline intermediate the forward and rearward sides thereof, the interior facing surface includes raised surface portions on either side of the interior recessed channel between the forward side of the body and the interior recessed channel, and between the interior recessed channel and the centerline, and the exterior facing surface includes raised surface portions on either side of the exterior recessed channel between the rearward side of the body and the exterior recessed channel, and between the exterior recessed channel and the centerline.

10. The automobile of claim 7, wherein the belt anchor body has a centerline intermediate the forward and rearward sides thereof, the body enlarged portion has an interior thick portion symmetrically oriented relative to the interior recessed channel about the centerline, and the body enlarged portion has an exterior thick portion symmetrically oriented relative to the exterior recessed channel about the centerline.

* * * * *